US006538643B2

(12) United States Patent
Mori et al.

(10) Patent No.: US 6,538,643 B2
(45) Date of Patent: Mar. 25, 2003

(54) REMOTE CONTROL HAVING A TOUCH PAD OPERABLE IN A PAD-TO-SCREEN MAPPING MODE FOR HIGHLIGHTING PRESELECTED PARTS OF A SLIDE DISPLAYED ON A DISPLAY SCREEN

(75) Inventors: Tamio Mori, Higashino-machi (JP); William Allen Yates, Camarillo, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 0 days.

(21) Appl. No.: 09/843,259

(22) Filed: Apr. 25, 2001

(65) Prior Publication Data

US 2002/0158852 A1 Oct. 31, 2002

(51) Int. Cl.[7] .................................................. G09G 5/00
(52) U.S. Cl. .......................... 345/173; 353/42; 353/122
(58) Field of Search ................................. 345/173, 174, 345/175, 176, 177, 179, 180; 178/18.01–18.11; 353/122, 94, 21, 42, 29

(56) References Cited

U.S. PATENT DOCUMENTS

| 4,146,314 | A |   | 3/1979  | Wilson            |         |
|-----------|---|---|---------|-------------------|---------|
| 4,291,954 | A |   | 9/1981  | Wilson            |         |
| 4,846,694 | A |   | 7/1989  | Erhardt           |         |
| 5,101,197 | A |   | 3/1992  | Hix et al.        |         |
| 5,235,363 | A |   | 8/1993  | Vogeley et al.    |         |
| 5,250,929 | A |   | 10/1993 | Hoffman et al.    |         |
| 5,327,160 | A |   | 7/1994  | Asher             |         |
| 5,428,417 | A |   | 6/1995  | Lichtenstein      |         |
| 5,448,263 | A |   | 9/1995  | Martin            |         |
| 5,485,176 | A |   | 1/1996  | Ohara et al.      |         |
| 5,545,857 | A | * | 8/1996  | Lee et al. ........... | 345/157 |
| 5,782,548 | A |   | 7/1998  | Miyashita         |         |
| 5,818,425 | A |   | 10/1998 | Want et al.       |         |
| 6,191,777 | B1| * | 2/2001  | Yashuhara et al. ..... | 345/173 |
| 6,225,976 | B1| * | 5/2001  | Yates et al. ........ | 345/156 |

* cited by examiner

Primary Examiner—Dennis-Doon Chow
(74) Attorney, Agent, or Firm—Brooks & Kushman, P.C.

(57) ABSTRACT

A method and system for presenting slides and images includes a display screen for displaying the slides one at a time, and a software program operable for enabling an operator to associate highlighting with preselected parts of the slides. A remote control includes a touch pad operable with the software program and the display screen for mapping touch pad portions to the preselected parts of the slides. The touch pad is further operable with the display screen for highlighting a preselected part of a slide being displayed on the display screen in response to the touch pad portion corresponding to the preselected part of the slide being touched.

17 Claims, 3 Drawing Sheets

REMOTE CONTROL HAVING A TOUCH PAD OPERABLE IN A PAD-TO-SCREEN MAPPING MODE FOR HIGHLIGHTING PRESELECTED PARTS OF A SLIDE DISPLAYED ON A DISPLAY SCREEN

TECHNICAL FIELD

The present invention relates generally to remote controls and, more particularly, to a remote control having a touch pad operable in a pad-to-screen mapping mode for highlighting preselected parts of a slide displayed on a display screen.

BACKGROUND ART

Home entertainment (HE), computer, communications, video recording, presentation, and other devices include a display screen for displaying slides, images, pictures, etc. Such HE devices include televisions. Such computer devices include desktop and laptop computers. Such communications devices include hand-held cellular telephones and personal digital assistants. Such video recording devices include digital cameras and personal video recorders. Such presentation devices include slide projectors.

Operators may use remote controls to control the devices remotely. Operators often use remote controls in conjunction with the display screens of the devices to control the devices. For instance, the display screens may have a cursor which the operator can navigate remotely by manipulating the remote control to control the device. Typically, remote controls include a set of buttons which correspond to control functions of a device. Touch pads and other position sensing devices have been incorporated into remote controls to provide the operator with greater control functionality. Touch pads sense the position of an object such as the operator's finger or stylus touching the touch pad and convey the position information to the device. In response, an object on the display screen such as a cursor may move in correspondence with the position of the object touching the touch pad.

An operator may use the display screen of a device to present slides or images on the display screen to an audience. For instance, an operator may use a software program such as the PowerPoint™ graphics presentation program by Microsoft Corporation™ to generate and present slides, images, etc., on the display screens of the devices for an audience to view. This graphic presentation program allows the operator to generate different slides and then display each individual slide on the display screen of a device for presentation to an audience. Typically, the operator may use a remote control to remotely control the device to display selected slides on the display screen during the presentation. During the presentation the operator may need to draw attention to a particular part of a slide being displayed on the display screen.

Typical graphics presentation programs allow an operator to associate highlighting techniques with a particular or specific part, point, portion, attribute, etc., of a slide for drawing attention to the particular part. The highlighting techniques include a color change, blinking or brightening effect, animated builds, check marks, underlining, etc., for drawing audience attention to particular parts of the slides. The operator uses the graphics presentation programs to build the slides and associate highlighting techniques with particular parts of the slides in a prescribed sequence as the operator prepares the slides for presentation. The operator then controls the device with the remote control to execute the highlighting of a particular part of a slide during the presentation. A problem is that once built into the slide presentation the highlighting of particular parts of the slides occurs in a prescribed sequence and during the presentation and the operator may want to change the highlighting sequence or not highlight specific parts of the slide at all. As a result, the operator loses flexibility and spontaneity during the presentation because the highlighting occurs in a prescribed sequence.

One approach to minimize this problem is to have the remote control configured with some sort of pointing device such as a laser pointer for drawing attention to specific parts of a slide. A problem with this approach is that the laser pointer does not draw audience attention as well as the highlighting techniques described above.

What is needed is a remote control having a touch pad in which preselected parts of slides to be displayed on a display screen of a device during a presentation are mapped to the touch pad such that the operator can touch a portion of the touch pad to highlight the preselected slide part corresponding to the touch pad portion being touched when the slide is being displayed on the display screen of the device during a presentation.

SUMMARY OF THE INVENTION

Accordingly, it is an object of the present invention to provide a method and system for presenting slides in which touch pad portions of a touch pad are mapped to preselected parts of a presented slide such that a preselected part of the presented slide is highlighted in response to the corresponding touch pad portion being touched.

It is another object of the present invention to provide a remote control having a touch pad operable in a pad-to-screen mapping mode for highlighting preselected parts of a slide displayed on a display screen.

It is a further object of the present invention to provide a remote control having a touch pad operable for mapping portions of the touch pad to preselected parts of a slide such that a remote control operator can highlight a preselected part of the slide displayed on a display screen by touching the touch pad portion corresponding to the preselected part of the slide.

In carrying out the above objects and other objects, the present invention provides a system for presenting slides. The system includes a display screen and a touch pad. The display screen is operable for displaying a slide. The touch pad has touch pad portions mapped to respective preselected parts of the slide. The touch pad is operable with the display screen such that a preselected part of the slide is highlighted in response to the touch pad portion corresponding to the preselected part of the slide being touched. The preselected parts of the slide are preselected by an operator.

The display screen may be the display screen of a home entertainment (HE) device, a television, a computer, a slide projector, a video projector, a communications device such as a cellular telephone or a personal digital assistant, or a video recording device such as a camera or a personal video recorder. The touch pad may be remotely operable with the display screen and may be the touch pad of a remote control.

Further, in carrying out the above objects and other objects, the present invention provides a system for presenting slides. The system includes associating means such as a software program for enabling an operator to associate highlighting with preselected parts of slides, and a display screen operable for displaying the slides one at a time. The system further includes a touch pad operable with the device and the display screen for mapping touch pad portions to the preselected parts of a slide being displayed on the display screen. The touch pad is further operable with the display screen for highlighting a preselected part of the slide being displayed on the display screen in response to the touch pad portion corresponding to the preselected part of the slide being touched. The touch pad may be remotely operable with the display screen for highlighting the preselected parts of the slide being displayed on the display screen.

Also, in carrying out the above objects and other objects, the present invention provides a method for presenting a slide using a remote control having a touch pad. The method includes preselecting parts of a slide for highlighting and associating highlighting with the preselected parts of the slide. Touch pad portions are then mapped to the preselected parts of the slide. The slide is then displayed on a display screen. A preselected part of the slide is then highlighted in response to the touch pad portion corresponding to the preselected part of the slide being touched.

The method may further include preselecting parts of at least two slides for highlighting, associating highlighting with the preselected parts of the at least two slides, mapping touch pad portions to the preselected parts of the at least two slides, and displaying the at least two slides on the display screen one at a time.

In carrying out the above objects and other objects, the present invention further provides a remote control for controlling a display screen displaying a slide. The remote control includes a position sensing device operable for mapping position sensing device portions to preselected parts of a slide being displayed on the display screen. The position sensing device is further operable for highlighting a preselected part of the slide being displayed on the display screen in response to the position sensing device portion corresponding to the preselected part of the slide being touched. The position sensing device may be a touch pad.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
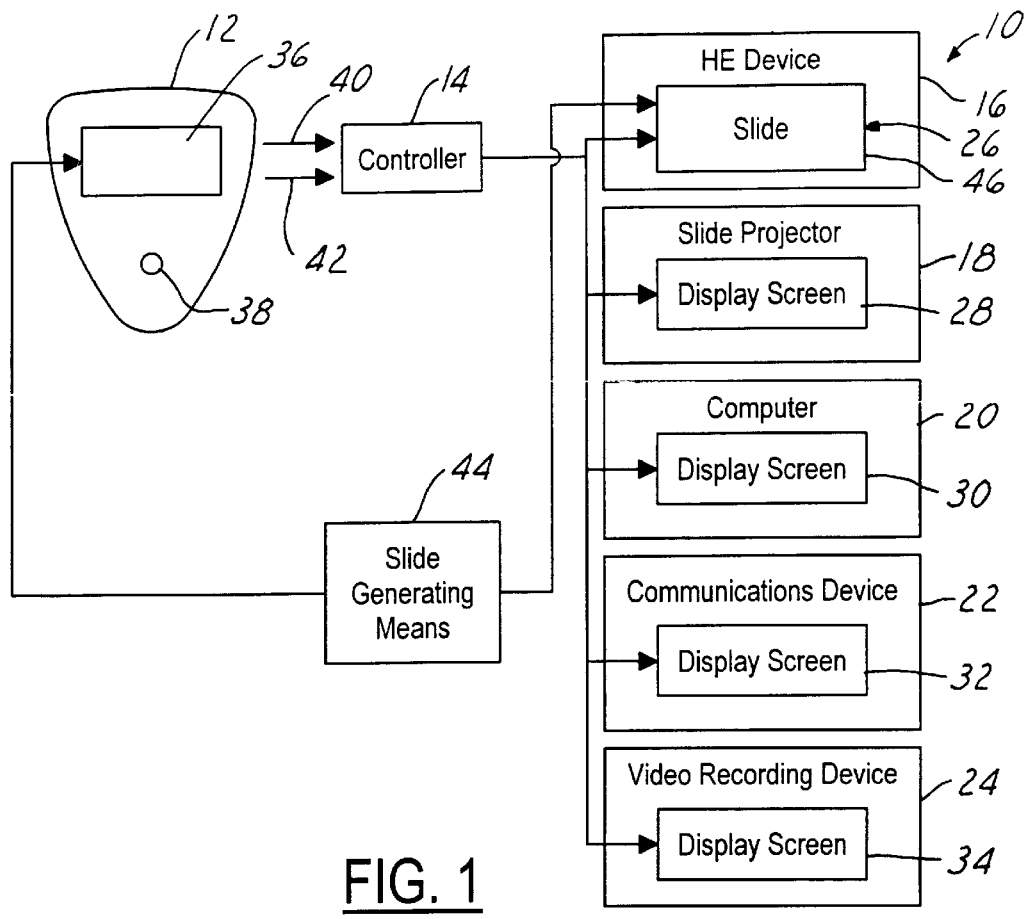
FIG. 1 illustrates a block diagram of a slide presentation system in accordance with the present invention.

Referring now to FIG. 1, a block diagram of a slide presentation system 10 in accordance with the present invention is shown. Slide presentation system 10 includes a remote control 12, a controller 14, and a device to be remotely controlled by the remote control. Such devices to be remotely controlled by remote control 12 include a home entertainment (HE) device or television 16; a slide projector 18 such as an LCD or digital light processor video projector; a computer 20 such as a laptop or desktop computer; a communications device 22 such as a cellular telephone or personal digital assistant; a video recording device 24 such as a camera or personal video recorder; and the like. Devices 16, 18, 20, 22, and 24 each include a respective display screen 26, 28, 30, 32, and 34 for displaying slides or images one at a time for an audience to view.

Remote control 12 includes a position sensing device 36 such as a touch pad. Remote control 12 generates a touch pad signal 40 in response to an operator touching the touch pad with a finger or stylus. Touch pad signal 40 is indicative of the location of the touch on touch pad 36. Touch pad signal 40 may also be indicative of the duration and the pressure of the touch on touch pad 36 for each location being touched. Remote control 12 further includes at least one control button 38. Remote control 12 generates a control button signal 42 in response to the operator pressing control button 38. Control button 38 may function as a computer mouse click button and generate a computer mouse click signal 42 upon being pressed by the operator.

The present invention will now be further described with reference to a slide such as slide 46 being displayed on display screen 26 of HE device 16. It is to be appreciated that the description of the present invention with respect to slide 46 being displayed on display screen 26 of HE device 16 represents the description of the present invention with respect to other slides being displayed on the respective display screens 28, 30, 32, and 34 of the other devices 18, 20, 22, and 24.

In operation, display screen 26 displays slide 46 as shown in FIG. 1. Touch pad 36 and display screen 26 each includes an area. Slide 46 is preferably displayed on the entire area of display screen 26 as shown in FIG. 1. Preferably, the areas of touch pad 36 and slide 46 are rectangular. Touch pad 36 is operable to map the area of the touch pad to the area of display screen 26 and slide 46. This means that each touch pad portion of touch pad 36 corresponds to a respective portion of slide 46. For instance, the upper left touch pad portion of touch pad 36 corresponds to the upper left portion of slide 46. Similarly, the middle bottom touch pad portion of touch pad 36 corresponds to the middle bottom portion of slide 46. Preferably, slide 46 has a much larger area than the area of touch pad 36. The mapping of touch pad 36 to slide 46 is scaled as a function of the ratio of the dimensions of the touch pad and the slide. Display screen 26 is at least part or all of the display screen area of HE device 16.

Controller 14 is operable with remote control 12 for receiving a touch pad signal 40 from the touch pad in response to an operator touching the touch pad. Controller 14 highlights a portion of slide 46 in response to a corresponding area of touch pad 36 being touched. Instead of highlighting portions of slide 46, controller 14 may user color change, outlining, or other ways of distinguishing the selected portions of the slide. Controller 14 is further operable with remote control 12 for receiving a control button signal 42 in response to the operator pressing control button 38. Controller 14 controls HE device 16 in accordance with control button signal 42. Controller 14 such as a set top box or the like may be coupled directly to or remotely located from HE device 16. Remote control 12 may be coupled remotely from controller 14 and transmits infrared (IR) or radio frequency (RF) signals 40 and 42 to communicate with controller 14. Remote control 12 and controller 14 may also be incorporated as one unit and coupled directly to HE device 16.

Slide presentation system 10 further includes slide generating means 44 for enabling an operator to generate slides such as slide 46 to be displayed on display screen 26 and associate highlighting techniques such as a color change, blinking or brightening effect, animated builds, check marks, underlining, etc., with a preselected part, point, portion, attribute, etc. of the slides for drawing audience attention to the preselected parts of the slides when they are displayed on the display screen. Slide generating means 44 preferably includes a software graphics presentation program such as the PowerPoint™ graphics presentation program by Microsoft Corporation™. Touch pad 36 is operable with slide generating means 44 for mapping touch pad portions with corresponding preselected parts of the slides. The operator may then touch a touch pad portion of touch pad 36 to execute the highlighting of a corresponding preselected part of a slide such as side 46 displayed on display screen 26 during a presentation.

Figure 2:
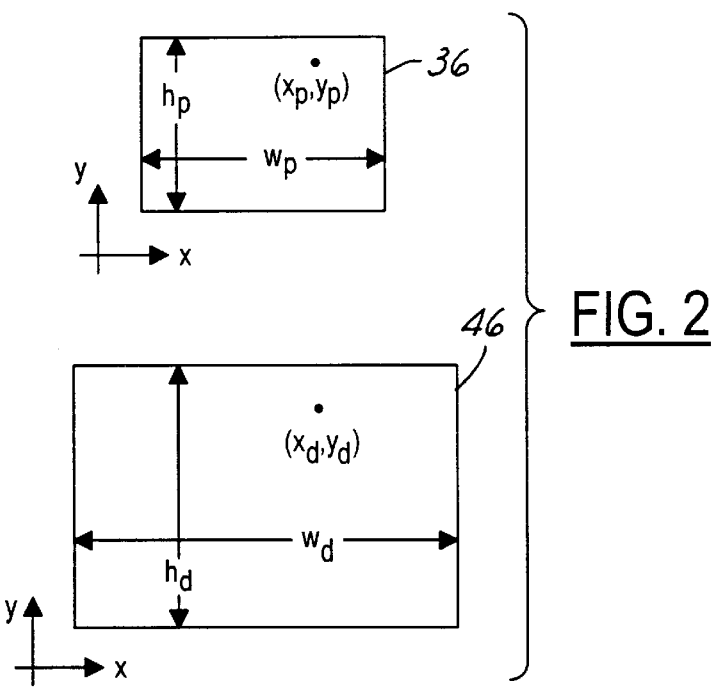
FIG. 2 illustrates the mapping of touch pad portions of the touch pad with respect to a slide being displayed on a display screen in accordance with the present invention.

Referring now to FIG. 2, the mapping of the touch pad portions of touch pad 36 with respect to slide 46 will now be described in further detail. As mentioned above, touch pad 36 is operable with slide 46 such that the dimensions of the touch pad are mapped to the dimensions of the slide. Thus, each touch pad point or portion of touch pad 36 corresponds with a respective point or portion of slide 46. Touch pad 36 has an area defined by a width $w_p$ and a height $h_p$. Slide 46 has an area defined by a width $w_d$ and a height $h_d$. A point of touch pad 36 such as point $x_p$, $y_p$ corresponds with a respective point $x_d$, $y_d$ of slide 46. The corresponding point $x_d$, $y_d$ of slide 46 is related to the point $x_p$, $y_p$ of touch pad 36 in accordance with the following equations:

$$x_d = x_p * (w_d/w_p)$$

$$y_d = y_p * (h_d/h_p).$$

That is, the x coordinate of the point of slide 46 ($x_d$) is equal to the x coordinate of the corresponding point of touch pad 36 ($x_p$) multiplied by the ratio between the widths of the slide ($w_d$) and the touch pad ($w_p$). Similarly, the y coordinate of the point of slide 46 ($y_d$) is equal to the y coordinate of the corresponding point of touch pad 28 ($y_p$) multiplied by the ratio between the heights of the slide ($h_d$) and the touch pad ($h_p$). As a result, each point of touch pad 36 has a corresponding point on slide 46.

Figure 3:
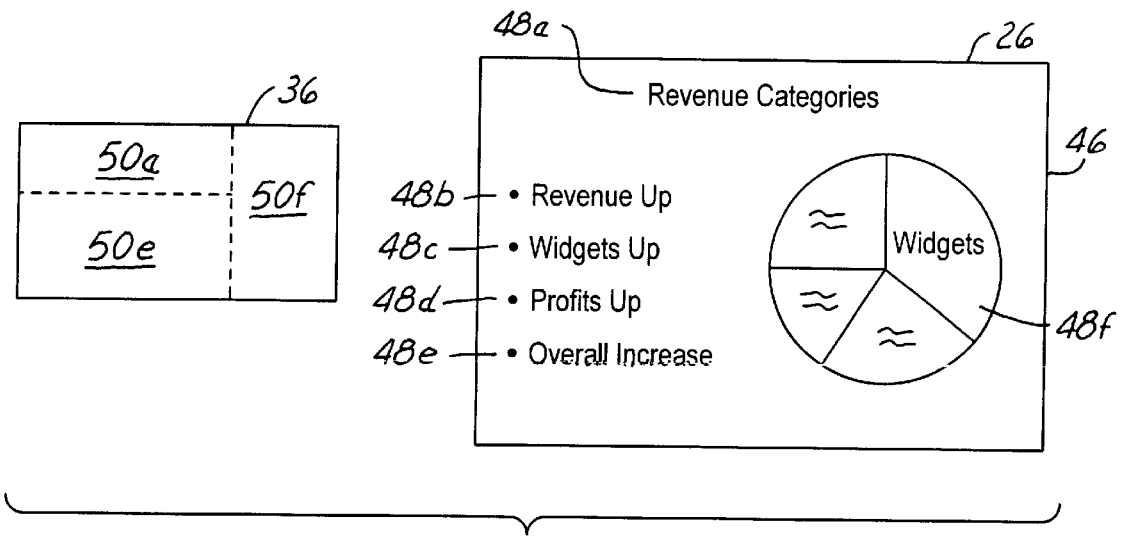
FIG. 3 illustrates the mapping of touch pad portions of the touch pad with respect to preselected parts of a slide being displayed on a display screen in accordance with the present invention.

Referring now to FIG. 3 with continual reference to FIGS. 1 and 2, the mapping of touch pad portions of touch pad 36 with respect to preselected parts of slide 46 displayed on display screen 26 will now be described in further detail. Display screen 26 presents slide 46 for an audience to view. Slide 46 includes a plurality of information parts 48a, 48b, 48c, 48d, 48e, and 48f which are generated by the operator using slide generating means 44 as the operator generates the slide. While generating the slide the operator may designate or preselect some of information parts 48 in slide 46 for highlighting during a presentation. The operator then uses slide generating means 44 to associate selected highlighting techniques with the preselected information parts 48. For instance, the operator may preselect information parts 48a, 48e, and 48f of slide 46 for highlighting. In response, slide generation means 44 associates the selected highlighting techniques with preselected information parts 48a, 48e, and 48f of slide 46.

Figure 4:
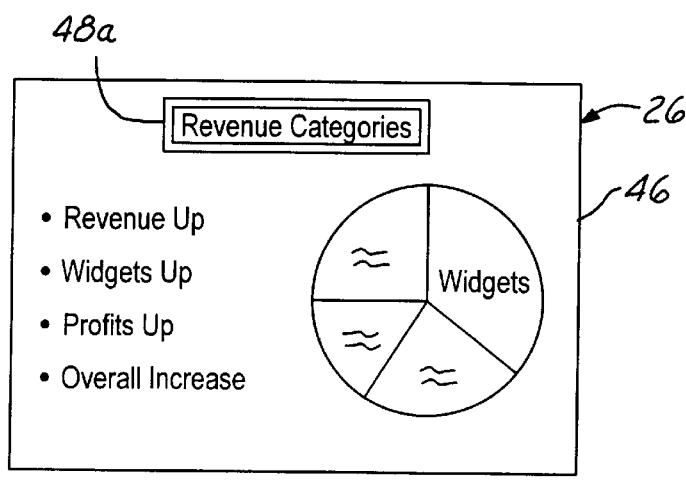
FIGS. 4 and 5 illustrate the highlighting of preselected information portions of a slide being displayed on a display screen in accordance with the present invention.
Figure 5:
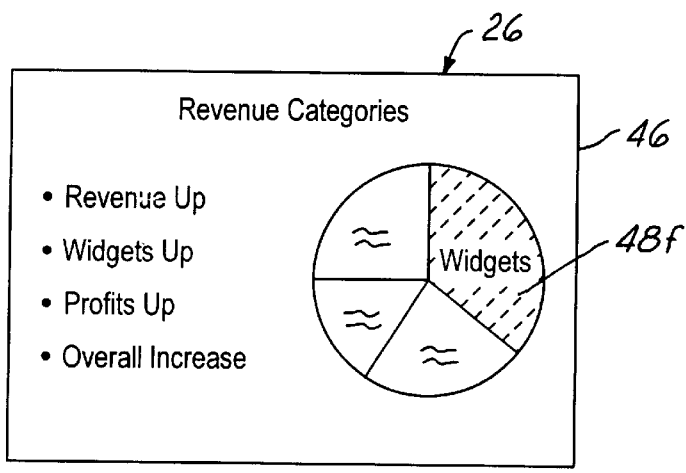

When slide 46 is displayed on display screen 26, touch pad 36 is operable with slide generation means 44 to subdivide its area and map relatively placed touch pad portions 50a, 50e, and 50f of touch pad 36 to correspond with the preselected information parts 48a, 48e, and 48f of image 46. The operator then touches a respective touch pad portion 50a, 50e, and 50f to highlight the preselected information part 48a, 48e, and 48f of image 46 corresponding to the respective touch pad portion. Controller 14 then executes the highlighting of the preselected information part 48a, 48e, and 48f corresponding to the respective touch pad portion 50a, 50e, and 50f being touched. For example, if touch pad portion 50a is touched then preselected information part 48a of slide 46 is highlighted as shown in FIG. 4. Similarly, if touch pad portion 50f is touched then preselected information part 48f of slide 46 is highlighted as shown in FIG. 5.

The entire area of touch pad 36 is mapped to the preselected information parts 48a, 48e, and 48f of image 46 displayed on display screen 26 such that each point of the touch pad corresponds to one of the preselected information parts. For example, each touch pad portion 50a, 50e, and 50f corresponds to a respective preselected information part 48a, 48e, and 48f of image 46 as a function of the positions of touch pad portions of touch pad 36 and the positions of the preselected information parts of image 46. For instance, touch pad portion 50a is in the upper portion of touch pad 36 and corresponds to preselected information part 48a located in the upper portion of image 46. Touch pad portion 50f is in the right side of touch pad 36 and corresponds to preselected information part 48f located in the right side of image 46. In operation, the operator touches a point of touch pad 28 falling within a certain touch pad portion 50a, 50e, and 50f. In response, the preselected information part 48a, 48e, and 48f of image 46 corresponding to the certain touch pad portion is highlighted.

Figure 6:
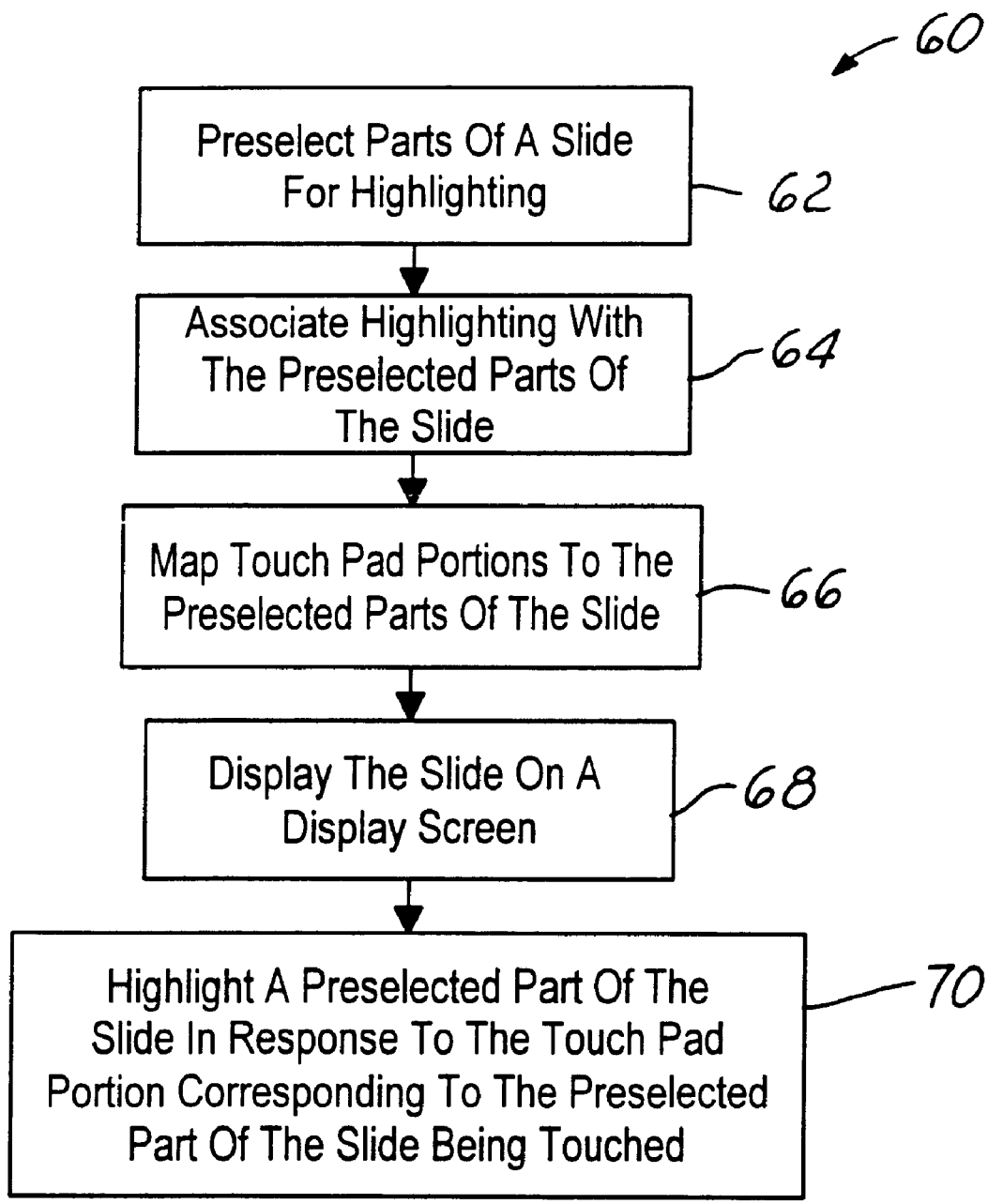
FIG. 6 illustrates a flowchart describing operation of the method and system in accordance with the present invention.

Referring now to FIG. 6, a flowchart 60 describing operation of the method and system in accordance with the present invention is shown. Flowchart 60 describes an operation for presenting a slide using remote control 12 and touch pad 36. Flowchart 60 begins with an operator preselecting parts of the slide for highlighting as shown in box 62. The operator then associates highlighting with the preselected parts of the slide as shown in box 64. Touch pad portions of touch pad 36 are then mapped to the preselected parts of the slide as shown in box 66. The slide is then displayed on a display screen 26 as shown in box 68. A preselected part of the slide is then highlighted in response to the touch pad portion corresponding to the preselected part of the slide being touched as shown in box 70.

Thus it is apparent that there has been provided, in accordance with the present invention, a remote control having a touch pad operable in a pad-to-screen mapping mode for highlighting preselected parts of a slide displayed on a display screen that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A system for presenting slides, the system comprising:
   associating means for enabling an operator to associate highlighting with preselected parts of slides;
   a display screen operable for displaying the slides one at a time after the highlighting has been associated with the preselected parts of the slides; and
   a touch pad operable with the associating means for mapping touch pad portions to the preselected parts of the slides prior to the slides being displayed on the display screen, wherein the touch pad is further operable with the display screen for highlighting a preselected part of a slid being displayed on the display screen in response to the touch pad portion corresponding to the preselected part of the slide being touched.

2. The system of claim 1 wherein:

the display screen is the display screen of a home entertainment (HE) device.

3. The system of claim 1 wherein:

the display screen is the display screen of a television.

4. The system of claim 1 wherein:

the display screen is the display screen of a computer.

5. The system of claim 1 wherein:

the display screen is the display screen of a slide projector.

6. The system of claim 1 wherein:

the display screen is the display screen of a video projector.

7. The system of claim 1 wherein:

the display screen is the display screen of a communications device.

8. The system of claim 7 wherein:

the communications device is a cellular telephone.

9. The system of claim 7 wherein:

the communications device is a personal digital assistant.

10. The system of claim 1 wherein:

the display screen is the display screen of a video recording device.

11. The system of claim 10 wherein:

the video recording device is a camera.

12. The system of claim 10 wherein:

the video recording device is a personal video recorder.

13. The system of claim 1 wherein:

the touch pad is remotely operable with the display screen for highlighting the preselected part of the slide being displayed on the display screen.

14. The system of claim 13 wherein:

the touch pad is the touch pad of a remote control.

15. The system of claim 1 wherein:

the preselected parts of the slide are preselected by an operator.

16. A method for presenting a slide on a display screen controllable by using a remote control having a touch pad, the method comprising:

preselecting parts of a slide for highlighting prior to the slide being displayed on a display screen;

associating highlighting with the preselected parts of the slide prior to the slide being displayed on the display screen;

mapping touch pad portions of a remote control having a touch pad to the preselected parts of the slide prior to the slide being displayed on the display screen;

displaying the slide on the display screen; and highlighting a preselected part of the slide being displayed on the display screen in response to the touch pad portion corresponding to the preselected part of the slide being touched.

17. The method of claim 16 wherein:

preselecting parts of a slide for highlighting includes preselecting parts of at least two slides for highlighting;

associating highlighting with the preselected parts of the slide includes associating highlighting with the preselected parts of the at least two slides;

mapping touch pad portions to the preselected parts of the slide includes mapping touch pad portions to the preselected parts of the at least two slides; and displaying the slide on the display screen includes displaying the at least two slides on the display screen one at a time.

* * * * *